Figure 1:
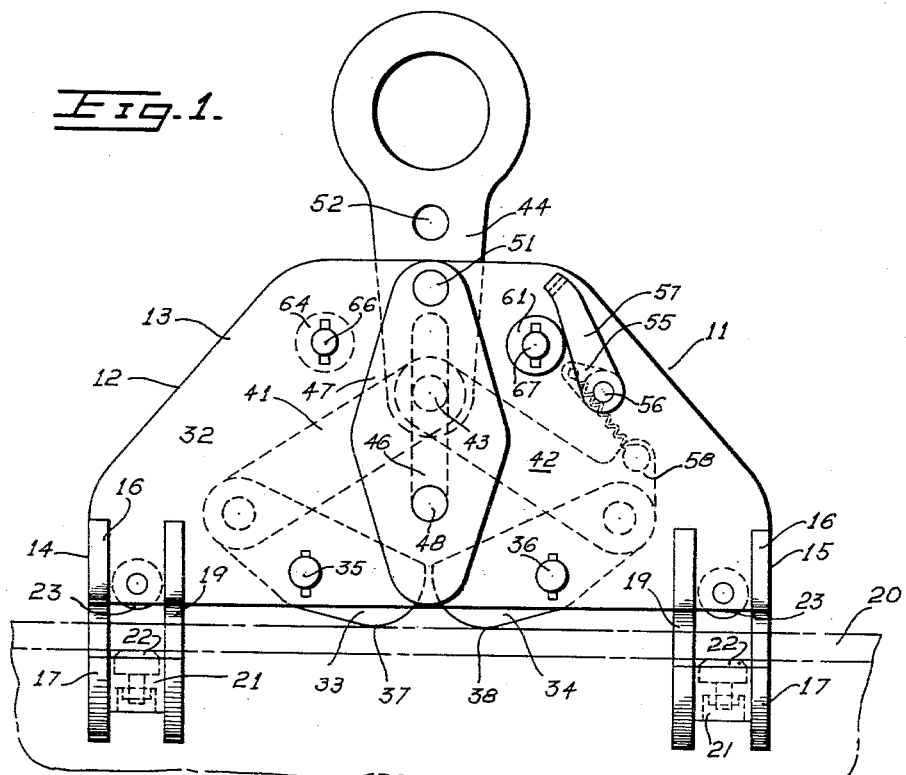

Dec. 29, 1964  R. C. RENFROE  3,163,457
LIFTING CLAMPS
Filed June 27, 1962  3 Sheets-Sheet 1

INVENTOR
ROBERT C. RENFROE
BY Irons, Birch, Swindler & McKie
ATTORNEYS

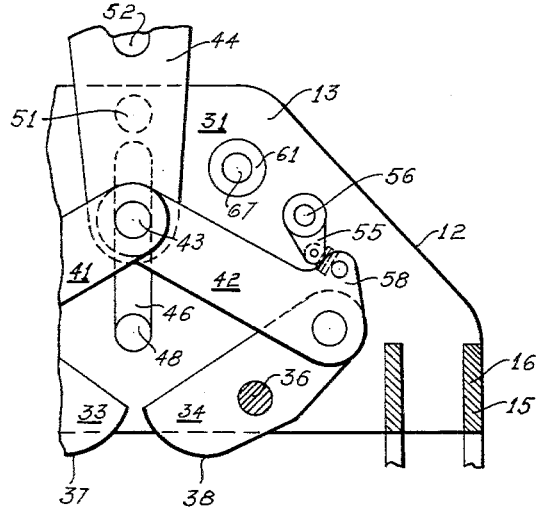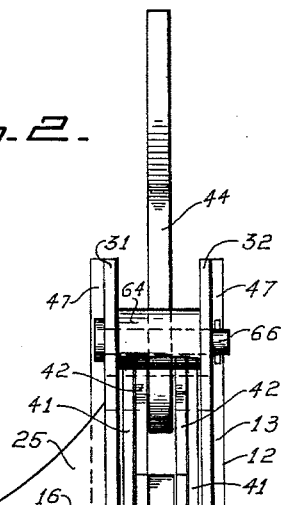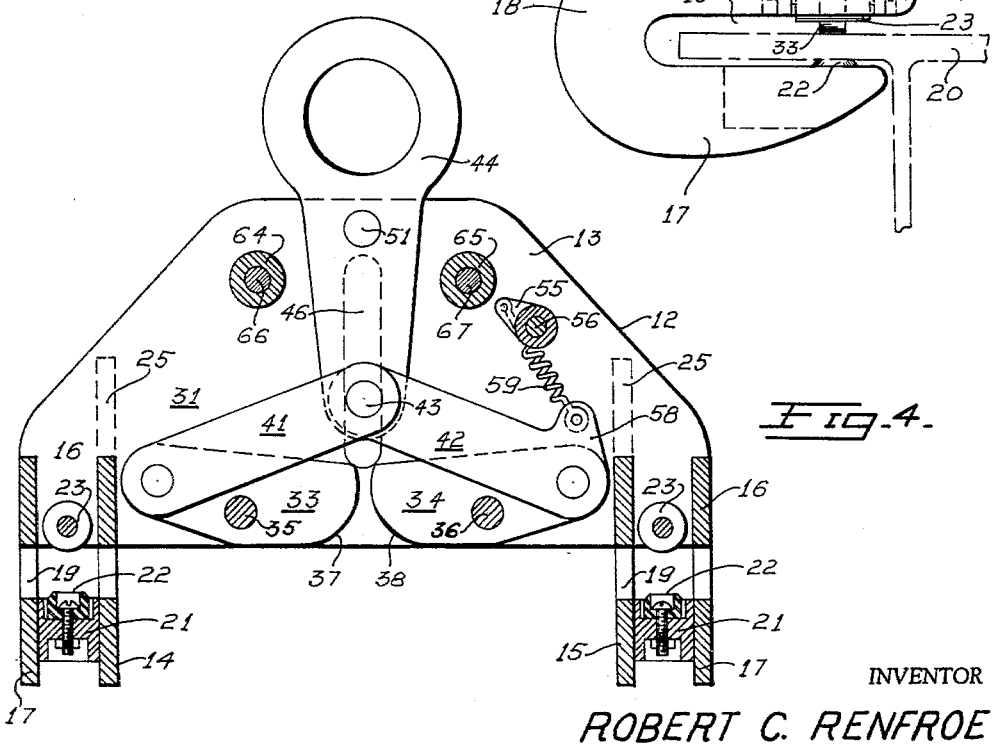

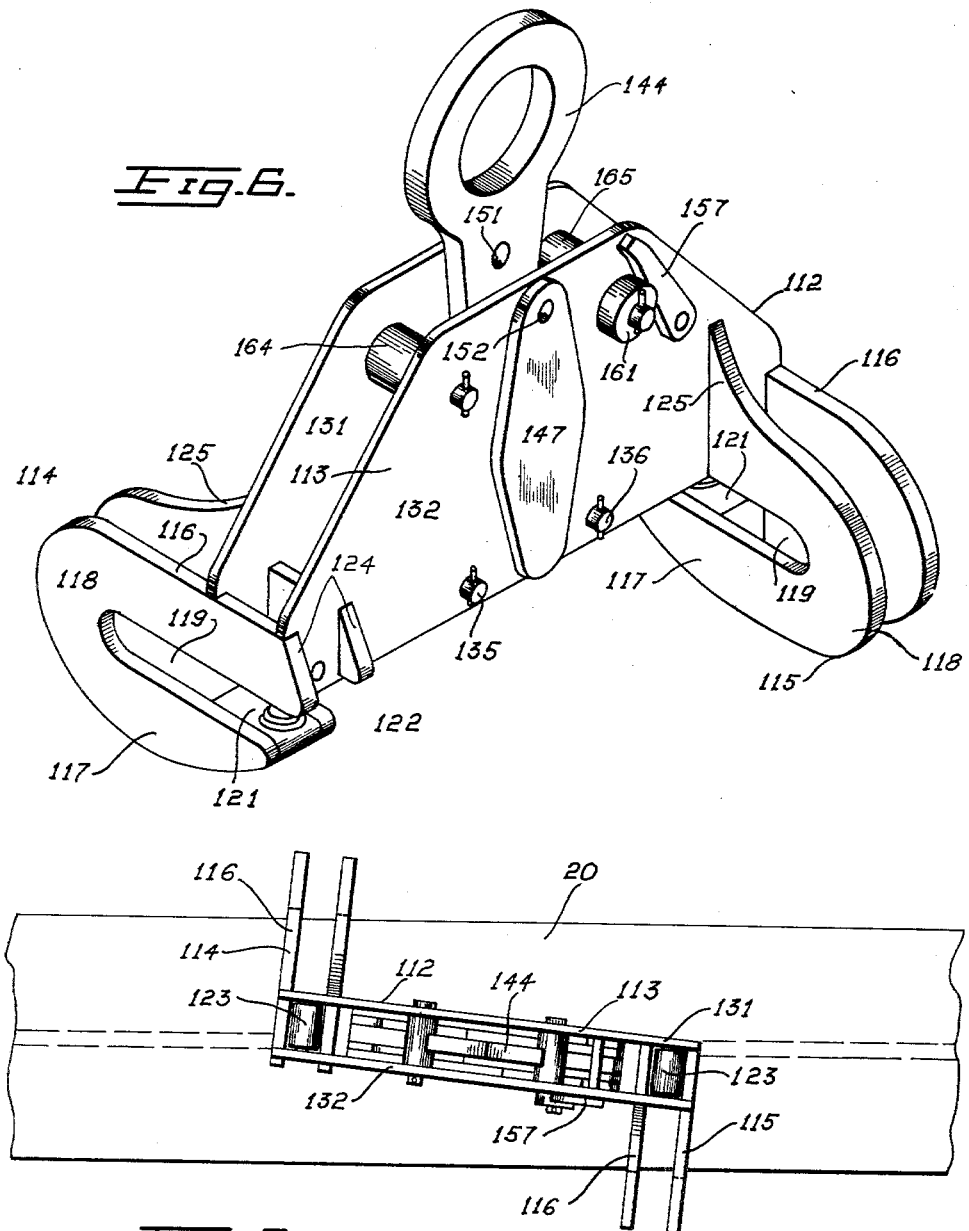

United States Patent Office 3,163,457
Patented Dec. 29, 1964

3,163,457
LIFTING CLAMPS
Robert C. Renfroe, Jacksonville, Fla., assignor to J. C. Renfroe & Sons, Inc., Jacksonville, Fla., a corporation of Florida
Filed June 27, 1962, Ser. No. 205,655
15 Claims. (Cl. 294—67)

This invention relates to clamps for lifting structural members and more particularly for use in the erection of such members in buildings and the like.

In the erection of buildings utilizing a framework of structural members of steel, aluminum or the like, such members must be raised to and held in their final position in the structure until permanent fasteners such as rivets or bolts are emplaced. Such members include I beams, H beams, girders, channels, angles and other structural shapes which are exceedingly heavy and cumbersome to handle. One conventional procedure has involved the use of a cable sling or "choker" to lift the beam or other member to the desired position. Such slings must be wrapped completely around the beam prior to lifting thus requiring at least one end of the member to be preliminarily raised to enable placement of the sling. Moreover, during movement of the beam, the sling loop is subject to slippage which not only is dangerous to personnel and equipment but increases the difficulty of proper placement of the beam. Further, the cable is subject to rapid wear requiring frequent replacement. Consequently the industry has been faced with a great need for a clamp capable of gripping a beam flange to raise the member to the desired position in the structure and hold it there during the emplacement of permanent fasteners. None of the lifting clamps heretofore available to the art have proved entirely satisfactory in such an erecting operation.

To overcome the disadvantages of the prior art it is an object of this invention to provide an improved lifting clamp for use in erecting structural beams and other members.

A further object of the invention is to provide such a clamp which securely grips the structural member to enable it to be lifted from any of a variety of initial attitudes including horizontal and vertical and maintain such grip regardless of variations in the attitude of the member while it is being moved.

A more specific object of the invention is to provide such a clamp which grips a structural beam flange near its web on one side only of the beam to lift the beam without substantial canting of the beam web from the vertical. Another specific object of the invention is to provide such a clamp which grips a beam flange near the web on opposite sides of the beam.

The invention relates generally to a lifting clamp which comprises a body defining a horizontal slot extending longitudinally through said body and open lips through which a flange of a structural member may be received laterally into said slot; said body including an upper body portion above said slot, a lower body portion below said slot and connecting means extending laterally around said slot opposite said open lips; said upper and lower body portions defining opposed jaw means above and below said slot respectively; at least one of said jaw means being movable to an open and closed position; and a movable shackle connected to said movable jaw means to apply a substantial closing force to said jaw means when a vertical lifting force is applied to said shackle and to retain said closing force when said member is raised by said lifting force. In a preferred embodiment, the clamp grips one side only of the flange of an I beam or the like while such flange is horizontal with the shackle so positioned and arranged that the lifting force may be applied to the clamp along a vertical line substantially in alignment with the beam web so that the beam is lifted without substantial canting of the web. It is especially preferred that the clamp jaws grip the beam flange near the intersection between the flange and the web. Another aspect of the invention is the inclusion in the clamp of a pair of pivoted central gripping jaws so mounted and connected to the shackle as to result in secure gripping of a flange by one or the other of the central jaws regardless of variations in the attitude of the beam being lifted.

Figure 3:
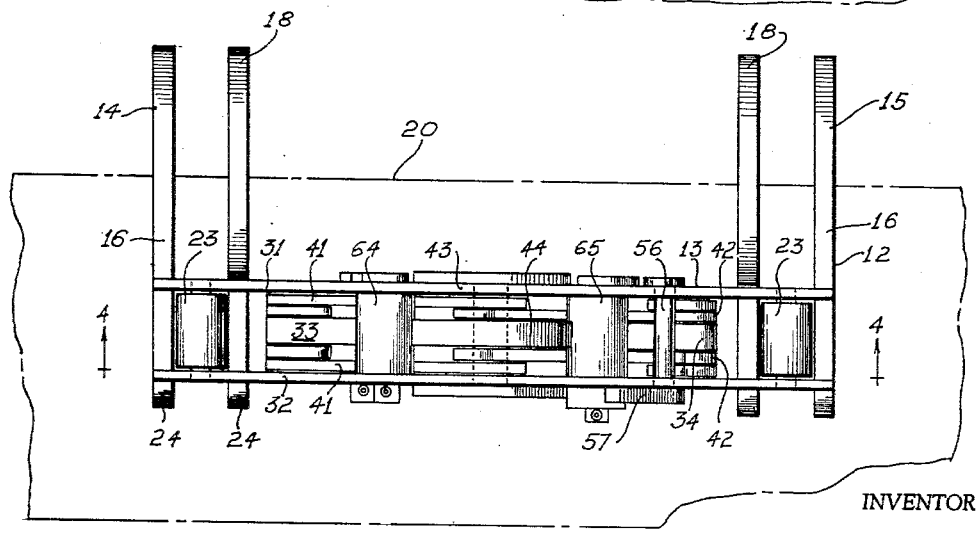

The invention having been generally described, certain specific embodiments will now be set forth in detail with reference to the accompanying drawings in which:

FIGURE 1 is a front elevation of a lifting clamp according to the invention;
FIGURE 2 is a side elevation of such clamp;
FIGURE 3 is a top plan view of such clamp;
FIGURE 4 is a vertical section taken along the line 4—4 of FIGURE 3;
FIGURE 5 is a fragmentary vertical section taken from the same position as FIGURE 4 and showing the clamp with the lock in neutral position;
FIGURE 6 is an isometric view of a modified form of lifting clamp according to the invention; and
FIGURE 7 is a top plan view of the clamp of FIGURE 6 showing the manner in which it is attached to the beam flange.

Depicted in FIGURES 1–5 is a clamp designated generally by the reference numeral 11. Such clamp includes a body 12 having a vertical central portion 13 and a pair of laterally disposed wing-like end portions 14 and 15. Each end portion is generally U-shaped in configuration and is laterally disposed with respect to the elongated central portion 13. The U-shaped end portions lie in spaced parallel vertical planes which are perpendicular to the general plane of the central portion 13. Each U-shaped end portion defines a pair of spaced legs 16 and 17 which are open at one end and are connected at their other end by a base portion 18 threby providing between the legs 16 and 17 a horizontal slot 19 extending from the base 18 to the open end of the legs 16 and 17. Desirably each of the U-shaped end members are comprised of a pair of horizontally spaced plates as shown for example in FIGURE 1.

The central portion 13 of the body 12 is rigidly connected as by welding to the upper leg 16 of each of the end portions 14 and 15 near the open end of such legs. The end portions 14 and 15 are so disposed relative to the central portion 13 that their slots 19 lie in a plane adjoining and transverse to the central portion 13 so that the central portion overlies a flat flange of a structural member such as the beam 20 which is received in such slots as best illustrated in FIGURE 3. The body 12 thus defines a longitudinal slot extending completely through the body to receive the beam flange with an upper vertical body portion including the central portion 13 above the slot and a lower horizontal body portion including the legs 17 below the slot. Such upper and lower portions are rigidly connected by the base portions 18 which extend laterally around the slot. Preferably the slots 19 are of substantial depth relative to the beam with which the clamp is employed so that the outer ends of the legs 16 and 17 extend close to the beam web as best shown in FIGURE 2. Thus the beam can be lifted by one clamp without substantial canting of the web from the vertical position.

The outer ends of the legs 16 and 17 define open lips through which the beam flange is received laterally into the body slot. Preferably a protruding lip 24 is provided on the outer end of each of the plates comprising the upper legs 16. A fillet 25 is provided at the juncture between the rear face of the central portion 13 and at least one of the plates comprising each of the legs 16. The upper surfaces of the lips 24 and the fillets 25 are inclined to cam the clamp away from obstacles which it may strike during elevation.

Connected between the outer ends of the spaced plates of each of the U-shaped end portions 14 and 15 is a cross member 21 which is countersunk on both its lower and upper faces as shown in FIGURE 4. Situated in the countersunk upper face of the cross member 21 of each of the end portions 14 and 15 is a swivel jaw 22. Such jaw is fastened by a bolt which extends through the cross member 21 and is attached by a nut in the countersunk lower face of such member. The swivel jaw 22 is freely rotatable about its axis but is restrained against movement axially with respect to its mounting bolt. The gripping face of the jaw 22 preferably is characterized by at least one sharp annular ridge which bites into the surface of a flange being lifted. Mounting of the clamp onto a beam flange is facilitated by a roller 23 which is rotatably journalled between the spaced plates of the body 12 so as to protrude slightly into the top of the slots 19.

The body 12 includes a pair of spaced vertical plates 31 and 32. Mounted between the plates 31 and 32 in the central portion 13 of the body 12 are a pair of central gripping jaws 33 and 34 which are pivotable about a pair of spaced pivots 35 and 36. The jaws 33 and 34 are characterized by gripping surfaces 37 and 38 which are positioned inwardly of the pivots 35 and 36 and preferably are ridged to enable them to bite into the beam flange. The ends of the jaws 33 and 34 opposite the gripping surfaces 37 and 38 are pivotally connected outwardly of the pivots 35 and 36 respectively to a pair of links 41 and 42. The upper ends of the links 41 and 42 are in turn connected by a pivot pin 43 to the lower end of a lifting shackle 44 which is vertically movable in the body 12. The links 41 and 42 together with the jaws 33 and 34 form a parallelogram linkage or toggle mechanism which pivots the jaws 33 and 34 to move the gripping surfaces 37 and 38 inwardly into the slots 19 when a lifting force is applied to the shackle 44. Conversely, when the shackle is depressed, the jaws 33 and 34 are pivoted to move the gripping surfaces 37 and 38 away from the slots 19.

The walls of the plates 31 and 32 are vertically slotted at 46 to provide a guide for the ends of the pivot pin 43. The slot 46 is perpendicular to the plane passing through the slots 19. A reinforcing pad 47 is welded or otherwise attached to the exterior face of each of the plates 31 and 32 to cover the slots 46. An opening 48 extends completely through the pads 47 at the lower terminus of the slots 46 to permit removal of the pin 43. When the jaw pivots 35 and 36 are in place, however, the toggle mechanism is not collapsible to the extent that the shackle pin 43 descends in the slots 46 to the opening 48. It is thus necessary first to remove the pivots 35 and 36 before the shackle pin 43 can descend to the opening 48 for removal thereby enabling the entire parallelogram linkage and the shackle to be removed from the body 12.

A second opening 51 extends through the entire body 12 including the plates 31 and 32 and the pads 47. A corresponding opening 52 extends through the shackle 44. The opening 52 is aligned with the opening 51 when the shackle 44 is in its lowermost position so that the jaws 33 and 34 are in a fully open position. Thus, the handle of a spud wrench or any drift pin may be inserted into the aligned openings 51 and 52 to lock the clamp in an open condition. The presence of the spud wrench or the like provides a visual warning that the clamp is in a locked open condition. It would be dangerous to attempt a lifting operation with the clamp locked open because in that state there would be gripping action due only to torque and a beam held by the clamp might well be shaken free of the clamp.

The clamp is also provided with a second locking mechanism. A locking member 55 is pivotally connected between the side plates 31 and 32 by a pin 56. Also connected to the pin 56 on the outside of plate 32 is a locking lever 57 which is hand operated to control the movement of the locking member 55. Connected between the outer end of the locking member 55 and a nose 58 on the lower end of link 42 is a tension spring 59. The locking lever 57 may be rotated to move the locking member 55 between a locked position as shown in FIGURE 4 to a neutral position as shown in FIGURE 5. To move the member 55 to a locked position the lever 57 is rotated in a counterclockwise direction until it rests against a stop 61 as shown in FIGURE 1. Since the spring 59 is situated in an overcenter condition to the left of the pivot 56 the member 55 is held in a locked position. In such position the spring 59 exerts an upward pull on the link 42 and thus tends to rotate the jaws 33 and 34 toward gripping position. Thus a constant locking bias is exerted on the jaws which prevents their losing their grip if the lifting force being applied to the shackle 44 should momentarily be removed as when the beam held by the clamp strikes an obstacle during descent. If the lever 57 is rotated from the locked position in a clockwise direction as shown in FIGURE 1 until the pivotal connection between the member 55 and the spring 59 passes dead center over the pivot 56 the spring 59 then exerts a force on the member 55 tending to rotate it in a clockwise direction toward a neutral position in which no upward bias is applied to the link 42 by the spring 59. As shown in FIGURE 5 the locking member 55 may be engaged behind the nose 58 to limit the upward movement of the link 42. The length of the member 55 is such, however, that it will not engage the nose 58 until the link 42 has been lifted sufficiently that the jaws 33 and 34 are moved into closed or gripping position. If desired, however, the member 55 may be of sufficient length as to engage behind the nose 58 to hold the jaws 33 and 34 in a locked open condition. Such a locking mechanism is shown, for example in Renfroe United States Patent 2,654,630. Preferably, however, the sole lock open mechanism utilized with respect to the present invention is that defined by the opening 51 and 52 which requires the insertion of a spud wrench or other device to give a visual warning of the lock open condition.

Situated between the plates 31 and 32 on opposite sides of the shackles 44 are a pair of spacer sleeves 64 and 65 which are pivotal about and are held in position by pins 66 and 67. The spacer sleeves 64 and 65 limit pivotal movement of the shackle 44 in a vertical plane longitudinally of the body 12. Where a lifting force is applied to the shackle in such a longitudinal direction it engages one or the other of the sleeves 64 or 65. Continued application of such force causes the shackle to roll outwardly over such sleeve which acts as a fulcrum about which the shackle rotates to apply an outward force to the shackle pin 43 thereby causing the jaws 33 and 34 to close.

In operation the clamp 11, with the locking lever 57 in neutral position, is mounted on the flange of a structural member such as the beam 20. The edge of the beam flange is inserted into the slots 19, such insertion being facilitated by the rollers 23. The clamp is moved toward the beam web as far as possible until the position of the clamp with respect to the beam is as shown in FIGURES 2 and 3. The locking lever 57 is then rotated in a counterclockwise direction to cause a closing bias to be applied to the jaws 33 and 34. When the beam 20 is in a horizontal position with the web vertical and a vertical lifting force is applied to the shackle, the latter moves upwardly to exert a further closing force on the jaws 33 and 34 causing them to bite deeply into the flange of the beam. The length of the various lever arms in jaws 33 and 34 and their toggle linkage may be adjusted so that the ratio of gripping force to lifting force may be multiplied to any desired magnitude. Continued lifting force on the shackle 44 results in the raising of the beam off of the ground or other supporting surface.

The jaws 22, 33 and 34 and the shackle 44 are in alignment close to the outer end of the leg 17 which is close to the beam web. Thus, the lifting force is applied in substantial vertical alignment with the web which lies at the center of gravity of the beam so that the beam is lifted without subsantial canting of the web from the vertical. It will be noted that the jaws could be so located in the clamp as to grip the flange at a location spaced further from the web. The shackle could then be laterally offset relative to the jaws so as to have its connection to the lifting cable substantially over the beam web, i.e., the center of gravity. Thus, the beam could still be lifted without substantial canting of the web from the vertical.

The vertical slot 46 maintains the movement of the shackle pin 43 in a verical direction perpendicular to the horizontal slot 19. Thus the shackle remains substantially in vertical alignment with the center of gravity of the load and further minimizes the possibility of canting of the beam web from the vertical. This is true regardless of variations in the thickness of the beam flange being gripped which results in corresponding variations in the position of the shackle pin in the guide slot 46.

It is also significant that the movement of the jaws 33 and 34 is such that they do not lose any of the gripping force if the beam does tip so as to cant the web from the vertical. It would be undesirable if such canting exerted a force on the jaws tending to open them.

If desired only one clamp may be employed at the longitudinal center of gravity of the beam. Alternatively, as many clamps 12 as desired may be attached to different points along the beam flange. Where beams with particularly wide flanges are handled, clamps may be mounted on opposite sides of the web. The beam is then elevated to its final position in the structure where attaching means are emplaced to retain the beam in such position. Then the locking lever 57 is released and the clamp may be removed. Preferably the clamp is locked open by the handle of a spud wrench or the like prior to removal.

Where the beam 20 is positioned horizontally with the web in a horizontal attitude the clamp 12 is positioned in the same manner previously described except that the lifting force is initially applied in a direction normal to the plane of the shackle. Such force applies a torque to the clamp which tends to rotate the beam to move the web toward an upright attitude. At some point in such movement the shackle begins to move outwardly and its normal gripping action ensues. The beam continues to rotate until the web reaches an upright attitude and is then lifted off of the ground in the manner previously described.

The clamp may also be employed to lift a beam which is in a vertical attitude. The beam is attached to the flange as previously described except that the clamp slot is vertical. A lifting force is then applied in the normal plane of the shackle rotation but in a direction longitudinally of the body slot. Such force causes the shackle to rotate against one of the stops 64 or 65 and then to pivot about such stop to move the shackle pin outwardly thereby causing the jaws 33 and 34 to close. Where the lifting force is applied to the left as the clamp is shown in FIGURE 4, the shackle rotates in a counterclockwise direction, the jaws close and the beam is moved to the left as shown in FIGURE 4. The drag or friction of the beam against the jaws tend to rotate the jaw 34 toward closed position and therefore to increase its bite. Such drag, however, tends to rotate the jaw 33 toward open position and therefore to decrease its bite. Thus, when the lifting force is in such direction the entire gripping action is exerted by the jaw 34 and little or none is exerted by the jaw 33. Conversely, when the direction of movement is to the right as shown in FIGURE 1 the shackle is rotated to the right and the friction of the beam flange tends to increase the gripping action on the jaw 33 and decrease that of the jaw 34. Thus, by virtue of the manner in which the jaws 33 and 34 are pivoted one of the jaws is always active when the clamp is lifting a beam vertically.

A modified clamp 111 is shown in FIGURES 6 and 7. The clamp 111 is identical to the clamp 11 except that the U-shaped end portions 114 and 115 are oriented with their base portions on opposite sides of the gripping jaws and with their open ends facing in opposite directions to receive the opposing edges of a beam flange as shown in FIGURE 7. In other respects the clamp 111 is identical to the clamp 11 and like parts of the two clamps are numbered with the same last two digits throughout. The operation of the clamp 111 is identical to that of the clamp 11 except for the difference in the manner in which they are mounted on the beam.

There has been illustrated and described what are considered to be preferred specific embodiments of the invention. It will be understood, however, that various modifications may be made by persons skilled in the art without departing from the scope of the invention which is defined solely by the appended claims.

What is claimed is:

1. A lifting clamp which comprises a body defining a horizontal slot extending longitudinally through said body with open lips at the mouth of the slot to receive laterally into said slot one side only of a horizontal flange of a beam having a vertical web centrally disposed below said flange; said body including an upper body portion above said slot, a lower body portion below said slot and connecting means extending laterally around said slot opposite said open lips; said upper and lower body portions defining opposed jaw means above and below said slot respectively; at least one of said jaw means being movable to an open and closed position, the lower jaw means protruding above said lower body portion at a location adjacent the outer end of said lower body portion and adapted to grip the flange of a beam adjacent its web; a shackle mounted for vertical movement in said upper body portion, said shackle having a pivot at its lower end connected to said movable jaw means to apply a substantial closing force to said jaw means when a vertical lifting force is applied to said shackle and to retain said closing force when said member is raised by said lifting force, and means restricting the movement of said shackle pivot to a vertical plane extending longitudinally relative to said body and passing substantially through said protruding lower jaw means so that said lifting force is applied in substantial vertical alignment with a beam web so that substantial canting thereof from the vertical is prevented when the clamp is applied to the flange of a beam.

2. A lifting clamp which comprises a body having an elongated central portion and laterally disposed generally U-shaped end portions, each of said end portions defining a pair of spaced legs open at one end and connected at their other end by a base portion to provide a slot extending longitudinally through said body between the legs of said end portions to receive a flat flange of a structural member, said central portion being rigidly connected to a first leg of each of said end portions to overlie a flange which is received in said slot, said central portion having a protruding gripping jaw means facing one side of said slot and the second legs of said end portions having longitudinally spaced protruding gripping jaw means facing the other side of said slot, at least one of said jaw means being movable to an open and closed position, and a shackle in said central portion connected to said movable jaw means and having a lifting connection to which a lifting force is normally applied along a line perpendicular to the plane of said slot to lift said clamp and cause said gripping jaws to grip a flange received in said slot, said shackle and the lower jaw means being substantially aligned in a vertical plane passing adjacent the outer end of the lower leg.

3. A lifting clamp which comprises a body having an elongated central portion and laterally disposed generally U-shaped end portions, each of said end portions defining a pair of spaced legs open at one end and connected at their other end by a base portion to provide a slot extending longitudinally through said body between the legs of said end portions to receive a flat flange of a structural member, said central portion being rigidly connected to a first leg of each of said end portions to overlie a beam flange which is received in said slot, the second legs of said end portions having protruding gripping jaws facing one side of said slot, said central portion having at least one protruding gripping jaw movable toward and away from said slot and facing the other side of said slot between said end gripping jaws, a shackle connected to said central portion jaw to move it into said slot in response to the application of lifting force to said shackle each of said jaws and said shackle being in substantial alignment longitudinally of said slot near the open ends of said leg portions.

4. A lifting clamp as recited in claim 3 where in said end portions have their base portions on the same side of said jaws with their open ends facing in the same direction to receive the same edge of a flange.

5. A lifting clamp as recited in claim 3 wherein said end portions have their base portions on opposite sides of said jaws with their open ends facing in opposite directions to receive opposing edges of a flange.

6. A lifting clamp which comprises a body having an elongated central portion and laterally disposed generally U-shaped end portions, each of said end portions defining a pair of spaced legs open at one end and connected at their other end by a base portion to provide a slot extending longitudinally through said body between the legs of said end portions to receive a flat flange of a structural member, said central portion being rigidly connected to a first leg of each of said end portions to overlie a beam flange which is received in said slot, the second legs of each of said end portions having protruding gripping jaws facing one side of said slot, a pair of longitudinally spaced central protruding gripping jaws connected to said central portion intermediate said end gripping jaws for movement laterally toward and away from said end gripping jaws, a shackle connected to said central gripping jaws to move them into flange gripping relation in response to the application of lifting force to said shackle.

7. A lifting clamp which comprises a body defining a horizontal slot extending longitudinally through said body and open lips through which a flange of a structural member may be received laterally into said slot, said body including an upper body portion above said slot, a lower body portion below said slot and rigid connecting means extending laterally around said slot opposite said open lips, said lower body portion having a pair of longitudinally spaced protruding gripping jaws facing upwardly in said slot, a pair of longitudinally spaced central gripping jaws spaced above said end gripping jaws, a pair of pivots connecting said central gripping jaws to said central portion, one of said central gripping jaws having a gripping surface on its lower face on one side of its pivot, the other of said central jaws having a gripping surface on its lower face on the other side of its pivot, shackle means connected to said central gripping jaws to rotate them in opposite directions to move their gripping surfaces toward said end jaws in response to the application of lifting force to said shackle means.

8. A lifting clamp as recited in claim 7 wherein said central gripping jaws are intermediate said end gripping jaws and have their gripping surfaces inwardly of their respective pivots.

9. A lifting clamp which comprises a body defining a horizontal slot extending longitudinally through said body and open lips through which a flange of a structural member may be received laterally into said slot, said body including an upper body portion above said slot, a lower body portion below said slot and rigid connecting means extending laterally around said slot opposite said open lips, said lower body portion having a pair of longitudinally spaced protruding gripping jaws facing upwardly in said slot, a pair of longitudinally spaced central gripping jaws spaced above and intermediate said end gripping jaws, a pair of pivots connecting said central gripping jaws to said central portion, said central gripping jaws having gripping surfaces on their lower faces located inwardly of their respective pivots, a shackle, a pair of links each of which is connected at one end by a pivot to said shackle and at its other end by a pivot to a respective one of said central gripping jaws outwardly of said jaw pivots to form a toggle mechanism to move said gripping surfaces laterally toward said end jaws in response to the application of lifting force to said shackle.

10. A lifting clamp according to claim 9 wherein said shackle is mounted in said body for movement about said pivot in a vertical plane longitudinally of said slot and further comprising means in said body defining vertical guide means for said shackle pivot, and stop means connected to said body and horizontally spaced on opposite sides of said guide means to act as fulcrums about which said shackle may pivot and along which said shackle may move to force said shackle pivot to move up along said guide means in response to the application of force to said shackle in a direction transverse to said guide means.

11. A lifting clamp according to claim 1 wherein each jaw means define rigid gripping surfaces to bite into a beam flange and at least one of said jaw means comprises a pair of longitudinally spaced jaws.

12. A lifting clamp according to claim 11 wherein said shackle pivot is connected to said movable jaw means by a force multiplying linkage.

13. A lifting clamp according to claim 6 wherein said shackle and the lower jaws are substantially aligned in a vertical plane extending longitudinally relative to said body and passing near the end of the lower leg.

14. A lifting clamp according to claim 7 wherein the said shackle means and the lower jaws are substantially aligned in a vertical plane extending longitudinally relative to said body and passing near the outer end of said lower body portion.

15. A lifting clamp according to claim 9 wherein the said shackle means and the lower jaws are substantially aligned in a vertical plane extending longitudinally relative to said body and passing near the outer end of said body portion.

References Cited in the file of this patent

UNITED STATES PATENTS

| 2,146,891 | Freeland | Feb. 14, 1939 |
| 2,429,969 | Wasco | Oct. 28, 1947 |
| 2,654,630 | Renfroe | Oct. 6, 1953 |
| 2,987,339 | Kaplan | June 6, 1961 |

FOREIGN PATENTS

| 1,077,409 | Germany | Mar. 10, 1960 |
| 1,230,272 | France | of 1960 |